United States Patent
Bashir et al.

(10) Patent No.: US 9,139,137 B2
(45) Date of Patent: Sep. 22, 2015

(54) VEHICLE INTERIOR STORAGE POCKET

(75) Inventors: Raza Ahmed Bashir, Sterling Heights, MI (US); Emery Jay Zadina, Canton, MI (US)

(73) Assignee: Johnson Controls Technology Company, Holland, MI (US)

(*) Notice: Subject to any disclaimer, the term of this patent is extended or adjusted under 35 U.S.C. 154(b) by 0 days.

(21) Appl. No.: 14/004,405

(22) PCT Filed: Mar. 15, 2012

(86) PCT No.: PCT/US2012/029261
§ 371 (c)(1),
(2), (4) Date: Nov. 18, 2013

(87) PCT Pub. No.: WO2012/125846
PCT Pub. Date: Sep. 20, 2012

(65) Prior Publication Data
US 2014/0062147 A1    Mar. 6, 2014

Related U.S. Application Data

(60) Provisional application No. 61/452,949, filed on Mar. 15, 2011.

(51) Int. Cl.
A47C 7/62    (2006.01)
B60R 7/04    (2006.01)
B60R 7/00    (2006.01)

(52) U.S. Cl.
CPC ............... B60R 7/043 (2013.01); B60R 7/005 (2013.01); *Y10T 29/49826* (2015.01)

(58) Field of Classification Search
CPC ............... B60R 2011/0012; B60R 2011/0015; B60R 7/00; B60R 2021/022; B60R 7/005

USPC ........ 297/188.04, 188.05, 188.07; 296/37.13, 296/37.8
See application file for complete search history.

(56) References Cited

U.S. PATENT DOCUMENTS

| 5,009,458 | A | * | 4/1991 | Shute ........................ 296/37.13 |
| 5,261,716 | A | * | 11/1993 | Phelps ....................... 296/37.8 |
| 5,499,853 | A | * | 3/1996 | Pourian ..................... 296/37.13 |
| 6,471,276 | B1 | * | 10/2002 | Brunsman et al. ......... 296/37.13 |
| 8,505,118 | B2 | * | 8/2013 | Bang ............................... 2/227 |

(Continued)

FOREIGN PATENT DOCUMENTS

| CN | 2463230 | 12/2001 |
| CN | 101454203 | 6/2009 |

(Continued)

OTHER PUBLICATIONS

International Search Report for application No. PCT/US2012/029261 mailed Jul. 4, 2012.

(Continued)

*Primary Examiner* — Laurie Cranmer
(74) *Attorney, Agent, or Firm* — Fletcher Yoder, P.C.

(57) ABSTRACT

A vehicle interior storage pocket includes a retaining sheet having a first side piece, a second side piece, and a resilient material extending between the first side piece and the second side piece. The resilient material is configured to bias the first and second side pieces toward one another. The vehicle interior storage pocket also includes a sleeve disposed about the retaining sheet, and configured to conceal the resilient material.

21 Claims, 5 Drawing Sheets

(56) References Cited

U.S. PATENT DOCUMENTS

| | | | |
|---|---|---|---|
| 2010/0102601 A1* | 4/2010 | Yasuda et al. | 297/188.04 |
| 2011/0198896 A1* | 8/2011 | Brinster et al. | 297/188.06 |

FOREIGN PATENT DOCUMENTS

| | | | | |
|---|---|---|---|---|
| FR | 1342623 | * | 9/1963 | B60R 7/005 |
| FR | 2791308 A1 | * | 9/2000 | B60R 7/00 |
| JP | 57-150520 | | 3/1956 | |
| JP | S56-30138 | | 8/1979 | |
| JP | 63-35641 | | 3/1988 | |
| JP | H04-119742 | | 10/1992 | |
| JP | 08-108803 | | 4/1996 | |
| JP | 2001097129 A | | 4/2001 | |
| JP | 2002-104079 | | 4/2002 | |
| JP | 2005205992 | | 8/2005 | |

OTHER PUBLICATIONS

International Preliminary Report on Patentability for PCT No. PCT/US2012/029261 dated Sep. 26, 2013; 8 pgs.
Japanese Office Action mailed Sep. 2, 2014.
Korean Office Action dated Dec. 22, 2014.
Chinese Office Action Mailed Mar. 2, 2015.
European Office Action Mailed Mar. 11, 2015.
Japanese Office Action mailed Jun. 23, 2015.

* cited by examiner

VEHICLE INTERIOR STORAGE POCKET

CROSS REFERENCE TO RELATED APPLICATIONS

This application claims priority from and the benefit of PCT Application No. PCT/US2012/029261, filed on Mar. 15, 2012; and U.S. Provisional Patent Application No. 61/452,949, filed on Mar. 15, 2011; both entitled "Vehicle Interior Storage Pocket", which are herein incorporated by reference.

BACKGROUND

The invention relates generally to a vehicle interior storage pocket.

Soft trim storage pockets may be positioned throughout a vehicle interior. For example, certain vehicle seats may include a storage pocket disposed on a seat back panel to facilitate storage of publications, maps and/or other small items. Typical storage pockets include a flexible piece of material secured to the bottom and sides of the seat back panel, thereby forming a pocket suitable for storage of small items. Certain storage pockets include an elastic strip sewn or otherwise coupled to a top edge of the pocket. The elastic strip serves to bias the top edge of the pocket toward the seat back panel. In this configuration, items may be placed into the storage pocket by grasping the top edge and pulling the top edge away from the seat back panel. After the items have been placed in the storage pocket, the top edge may be released, thereby enabling the elastic strip to drive the top edge of the pocket toward the seat back panel.

As will be appreciated, the length of the top edge is selected to facilitate expansion of the pocket to the fully open position. As a result, the length of the top edge is generally greater than the width of the pocket. Consequently, when the top edge of the storage pocket is in contact with the seat back panel (e.g., when the pocket is in the closed position), wrinkles or gathers will develop adjacent to the top edge, thereby providing an undesirable appearance. Furthermore, it should be appreciated that pockets configured to provide larger openings will increase the number and/or size of the wrinkles, thereby further detracting from the appearance of the storage pocket.

BRIEF DESCRIPTION OF THE INVENTION

The present invention relates to a vehicle interior storage pocket including a retaining sheet having a first side piece, a second side piece, and a resilient material extending between the first side piece and the second side piece. The resilient material is configured to bias the first and second side pieces toward one another. The vehicle interior storage pocket also includes a sleeve disposed about the retaining sheet, and configured to conceal the resilient material.

The present invention also relates to a vehicle interior storage pocket including a first side piece having an outer side edge secured to a vehicle interior trim component, and a bottom edge secured to the vehicle interior trim component. The vehicle interior storage pocket also includes a second side piece having an outer side edge secured to the vehicle interior trim component, and a bottom edge secured to the vehicle interior trim component. The vehicle interior storage pocket further includes a resilient material extending between the first side piece and the second side piece. The first side piece, the second side piece and the resilient material form a retaining sheet, and the resilient material is configured to bias the first and second side pieces toward one another. In addition, the vehicle interior storage pocket includes a sleeve disposed about the retaining sheet. The sleeve includes a bottom edge secured to the vehicle interior trim component, and the sleeve is configured to conceal the resilient material.

The present invention further relates to a method of manufacturing a vehicle interior storage pocket, including securing a resilient material between a first side piece and a second side piece to form a retaining sheet. The method also includes disposing a sleeve about the retaining sheet to conceal the resilient material.

DRAWINGS

DETAILED DESCRIPTION

Figure 1:
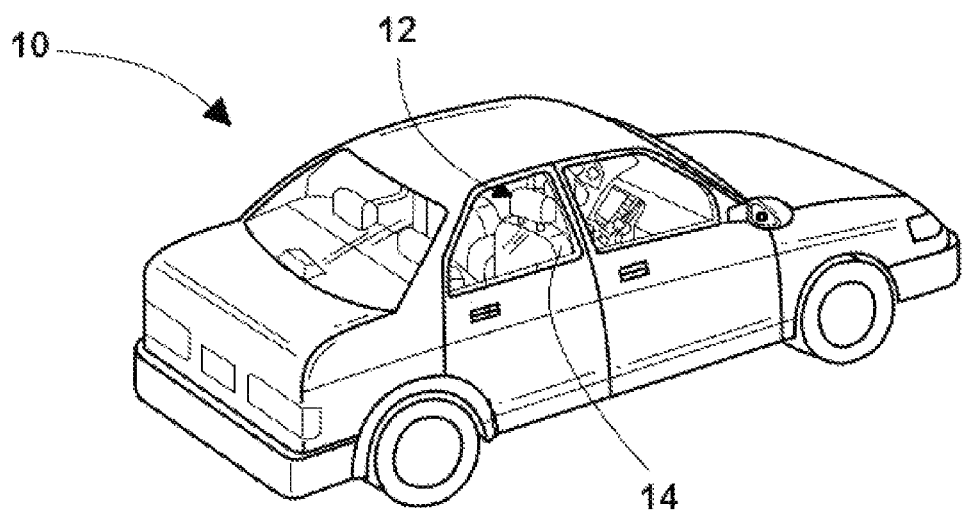
FIG. 1 is a perspective view of an exemplary vehicle including one or more interior trim components having respective storage pockets.

FIG. 1 is a perspective view of a motor vehicle 10 including one or more interior trim components having respective storage pockets. As illustrated, the vehicle 10 includes an interior 12 having a seat 14. As discussed in detail below, a storage pocket is coupled to a back panel of the seat 14, thereby providing storage space for rear seat occupants. The storage pocket includes a retaining sheet having a resilient material connecting a first side piece to a second side piece. The storage pocket also includes a sleeve disposed about the retaining sheet to conceal the resilient material. In this configuration, the resilient material biases the side pieces toward one another, thereby driving the storage pocket to a closed position. As an occupant pulls a top edge of the pocket away from the seat back panel, the resilient material expands, thereby providing access to the interior of the storage pocket. Because the sleeve conceals the resilient material, the storage pocket maintains a desirable appearance in both the open and closed positions. In addition, the sleeve forms a receptacle between a show surface of the retaining sheet and a rear surface of the sleeve, thereby providing additional storage space.

Figure 2:
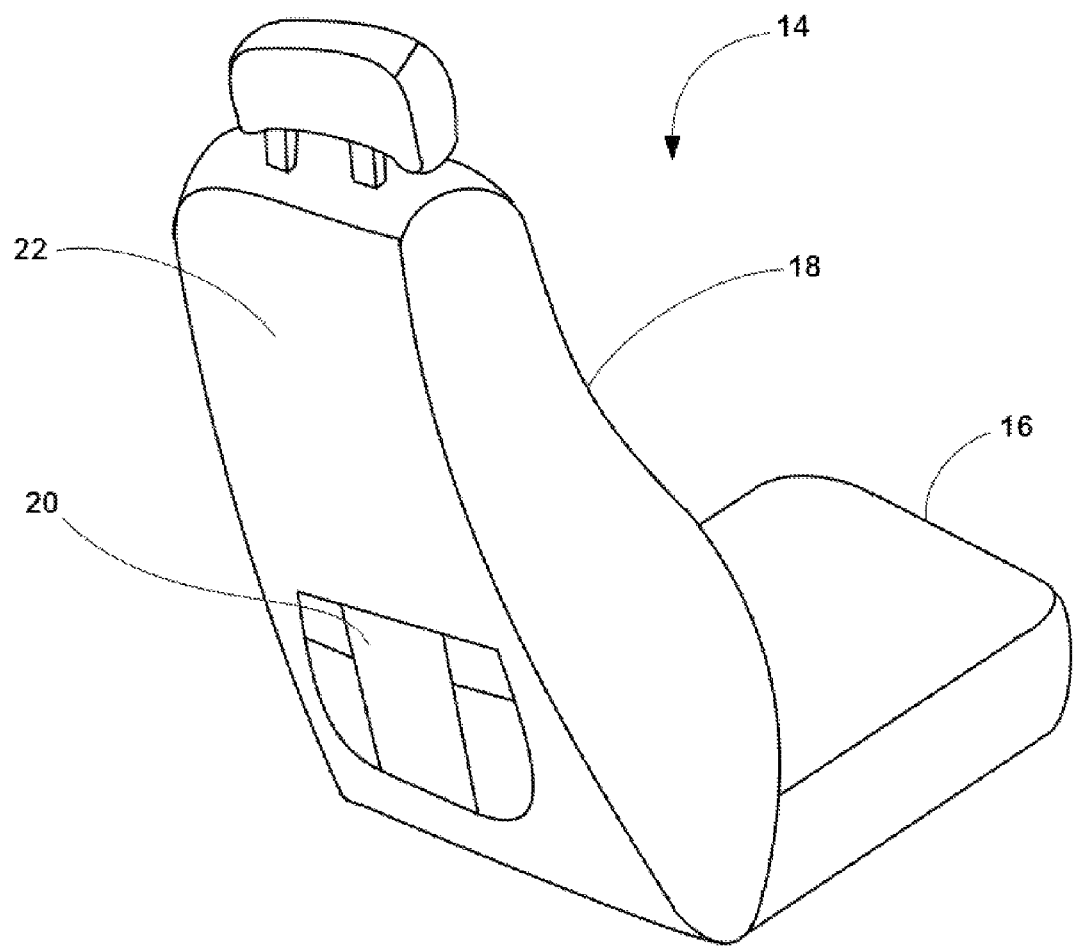
FIG. 2 is a perspective view of the seat shown in FIG. 1, including a storage pocket coupled to a back panel of the seat.

FIG. 2 is a perspective view of the seat shown in FIG. 1, including a storage pocket coupled to a back panel of the seat. As illustrated, the seat 14 includes a seat bottom 16 and a seat back 18. In certain embodiments, the seat bottom 16 includes a seat bottom chassis, one or more cushions, and a fabric covering. The seat bottom chassis serves to support the weight of a passenger during normal vehicle operation and during high g-force events (e.g., rapid acceleration or deceleration, etc.). Furthermore, the seat bottom chassis secures the seat bottom 16 to a floor of the vehicle 10, and provides a mounting surface for the seat back 18. One or more cushions may be coupled to the seat bottom chassis to provide passenger comfort, and the fabric covering may be disposed about the assembly to provide a desired appearance and/or to protect the internal components of the seat bottom 16. The seat back 18 may be constructed in a similar manner, i.e., from one or more cushions secured to a rigid chassis and wrapped with a fabric covering.

In the illustrated embodiment, the seat back 18 includes a storage pocket 20 coupled to a back panel 22 of the seat 14. In the present embodiment, the back panel 22 is formed from a substantially rigid material, such as hard plastic. In addition, the back panel 22 may include a coverstock coupled to the substantially rigid material to form a show surface having a desirable appearance and/or texture. As discussed in detail below, the storage pocket 20 includes a retaining sheet having a first side piece, a second side piece, and a resilient material extending between the first side piece and the second side piece. The resilient material is configured to bias the first and second side pieces toward one another, thereby driving the storage pocket toward a closed position (e.g., in which a top edge of the retaining sheet contacts the back panel 22). The vehicle interior storage pocket also includes a sleeve disposed about the retaining sheet to conceal the resilient material. Such a storage pocket configuration may provide a more desirable appearance than conventional storage pockets.

For example, certain storage pockets include an elastic strip sewn or otherwise coupled to a top edge of a continuous retaining sheet. In such storage pockets, the length of the top edge is selected to facilitate expansion of the pocket from the closed position to the fully open position. As a result, the length of the top edge of the retaining sheet is generally greater than the width of the pocket. Consequently, when the top edge is in contact with the seat back panel (e.g., when the pocket is in the closed position), wrinkles or gathers will develop adjacent to the top edge, thereby providing an undesirable appearance. In contrast, the illustrated storage pocket 20 substantially reduces or eliminates the formation of wrinkles and gathers by providing side pieces that are not coupled to one another at the top edge. As a result, the length of the top edge of the pocket may vary (i.e., by expansion and retraction of the connecting resilient material) without inducing wrinkles or gathers to form in the top edge of the first and second side pieces of the retaining sheet. Furthermore, because the sleeve conceals the resilient material, the storage pocket maintains the desirable appearance in both the open and closed positions. While the storage pocket is described below with reference to a vehicle seat, it should be appreciated that storage pockets having a sleeve disposed about a retaining sheet to conceal the resilient material may be positioned throughout the vehicle interior 12. For example, a storage pocket may be coupled to a door panel, an instrument panel, an armrest and/or other trim components of the vehicle 10.

Figure 3:
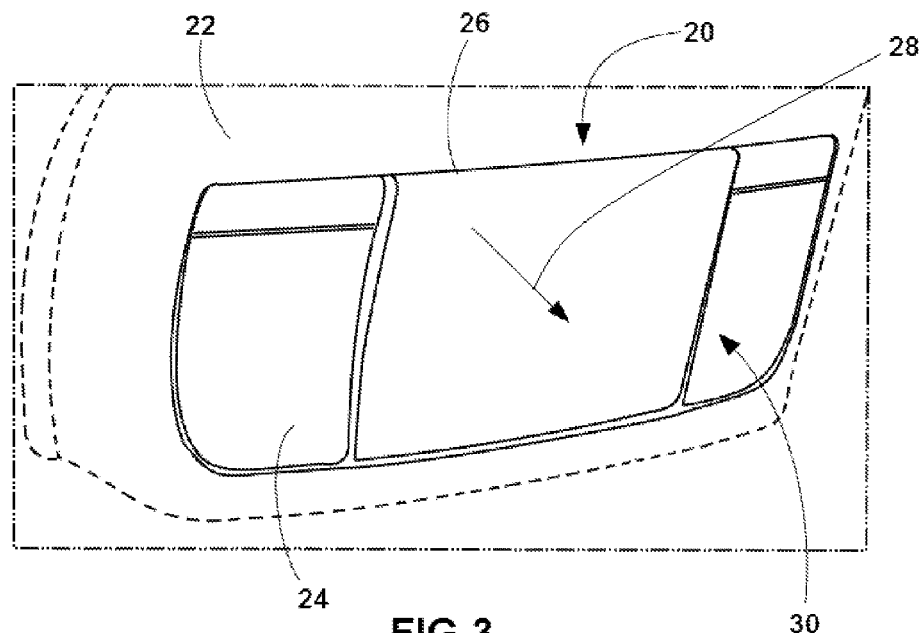
FIG. 3 is a front perspective view of an exemplary embodiment of the storage pocket shown in FIG. 2.

FIG. 3 is a front perspective view of an exemplary embodiment of the storage pocket shown in FIG. 2. As illustrated, the storage pocket 20 includes a retaining sheet 24 and a sleeve 26. As discussed in detail below, the retaining sheet 24 includes a first side piece, a second side piece and a resilient material extending between the first and second side pieces. The sleeve 26 is disposed about the retaining sheet 24 to conceal the resilient material. In this configuration, the resilient material biases the pocket 20 toward the illustrated closed position. An occupant may transition the storage pocket 20 toward an open position by grasping the top edge of the pocket and pulling away from the back panel 22 in the direction 28. As a result, the resilient material will expand, thereby extending the length of the top edge of the pocket 20. Because the two side pieces are not coupled to one another along the top edge, the formation of wrinkles or gathers, which may be formed along the top edge of pockets having a continuous retaining sheet, are substantially reduced or eliminated. In addition, the sleeve 26 forms a receptacle 30 between a show surface of the retaining sheet and a rear surface of the sleeve, thereby providing additional storage space.

It should be appreciated that the retaining sheet 24 and the sleeve 26 may be formed from any suitable flexible material. For example, in certain embodiments, the sheet 24 and the sleeve 26 may be formed from a woven or non-woven fabric. Alternatively, the sheet 24 and the sleeve 26 may be formed from leather, a synthetic material, or any combination of suitable materials. In certain embodiments, the color and texture of the sleeve 26 may be particularly selected to match the color and texture of the retaining sheet 24. In alternative embodiments, the sleeve 26 and the sheet 24 may include materials having contrasting colors or textures. For example, in one embodiment, the retaining sheet may be formed from a woven fabric and the sleeve may be formed from leather. Furthermore, it should be appreciated that a variety of decorative and/or structural stitching may be employed throughout the pocket 20, thereby providing a desired strength and/or appearance.

Figure 4:
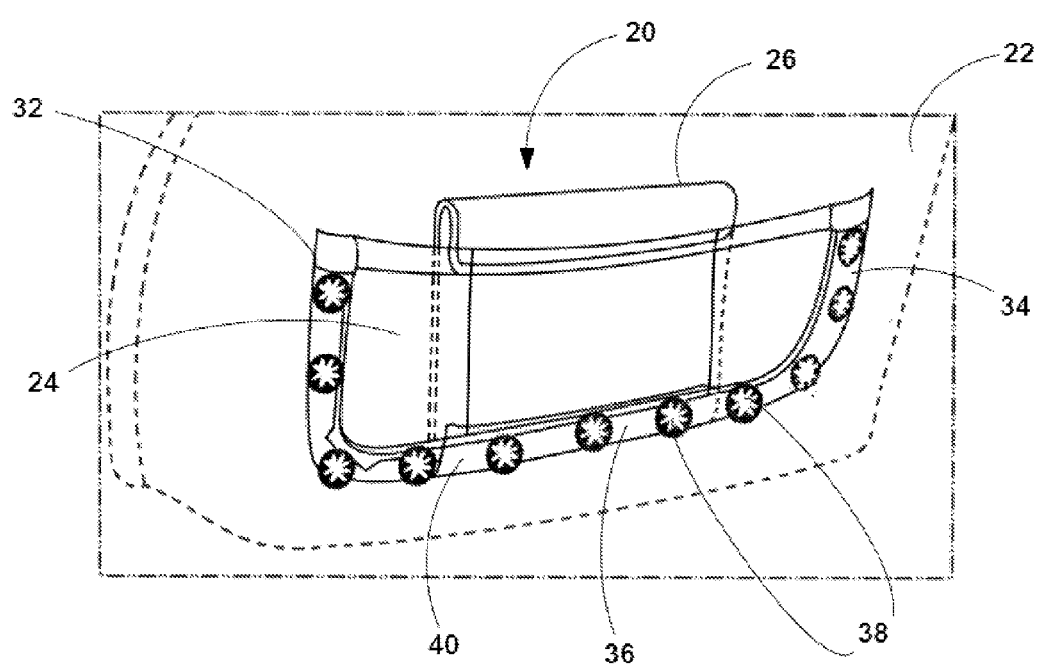
FIG. 4 is a back perspective view of the storage pocket shown in FIG. 3.

FIG. 4 is a back perspective view of the storage pocket shown in FIG. 3. As illustrated, the retaining sheet 24 is secured to the back panel 22 along a first side edge 32, along a second side edge 34, and along a bottom edge 36. Specifically, multiple fasteners 38 are positioned along the edges 32, 34 and 36 to couple the retaining sheet to the back panel 22 of the seat 14. This configuration provides a rigid connection between the retaining sheet 24 and the back panel 22, while facilitating access to the pocket 20 via the top edge. Similarly, a bottom edge 40 of the sleeve 26 is coupled to the back panel 22 by the fasteners 38, thereby securing the sleeve 26 to the seat 14 and blocking lateral movement of the sleeve 26 with respect to the retaining sheet 24. In the illustrated embodiment, the fasteners include studs extending through the retaining sheet 24 and the sleeve 26, and secured to the back panel 22 with push nuts. However, it should be appreciated that alternative coupling methods (e.g., adhesive, sewn, etc.) may be employed in alternative embodiments.

Figure 5:
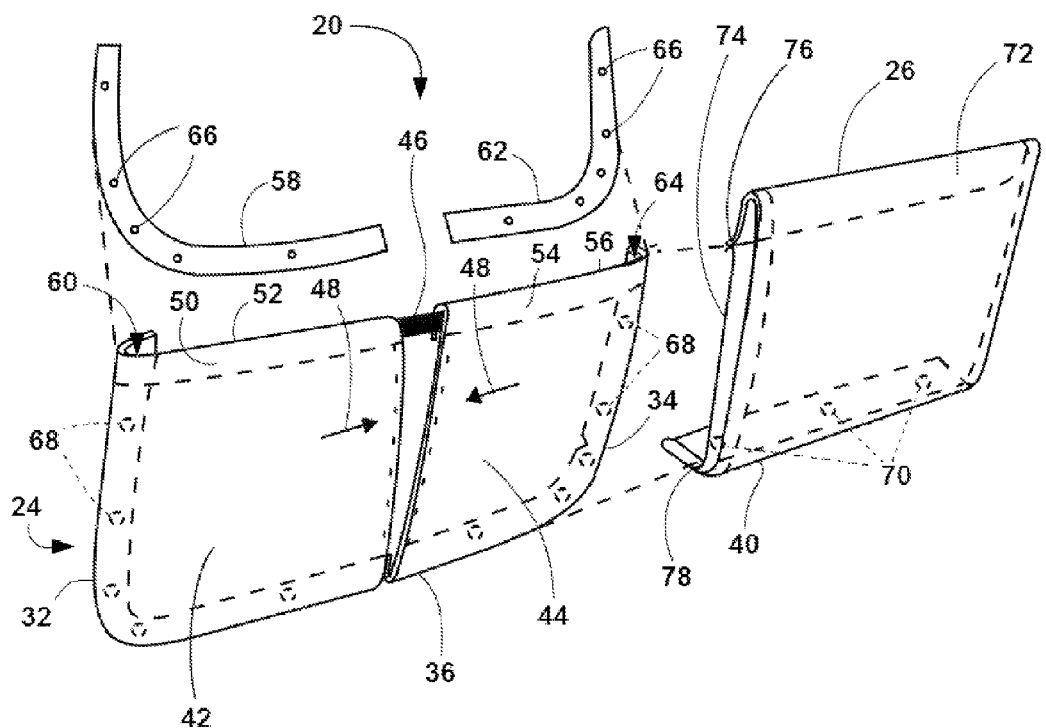
FIG. 5 is an exploded view of the storage pocket shown in FIG. 3, including an embodiment of a retaining sheet.

FIG. 5 is an exploded view of the storage pocket 20 shown in FIG. 3, including an embodiment of a retaining sheet 24. As illustrated, the retaining sheet 24 includes a first side piece 42 and a second side piece 44 positioned on opposite lateral sides of the retaining sheet 24. Resilient material 46, such as the illustrated elastic band, extends between the first side piece 42 and the second side piece 44, and biases the first and second side pieces 42 and 44 toward one another in a laterally inward direction 48. In the illustrated embodiment, the first side piece 42 includes a hemmed pocket 50 positioned adjacent to a top edge 52 of the first side piece 42. Similarly, the second side piece 44 includes a second hemmed pocket 54 positioned adjacent to a top edge 56 of the second side piece 44. The resilient material 46 extends through the first and second hemmed pockets 50 and 54, thereby providing an elastic connection between the side pieces.

The illustrated storage pocket 20 also includes a first reinforcing bezel 58 configured to be disposed within a recess 60 extending along the outer edge 32 and the bottom edge 36 of the first side piece 42. The storage pocket 20 also includes a second reinforcing bezel 62 configured to be disposed within a recess 64 extending along the outer edge 34 and the bottom edge 36 of the second side piece 44. The bezels 58 and 62 are configured to provide additional structural support to the edges of the storage pocket 20. As illustrated, the first bezel 58 and the second bezel 62 include openings 66 configured to align with openings 68 within the retaining sheet 24. The openings 66 and 68 are configured to facilitate passage of the fasteners 38 into the back panel 22. For example, the openings 66 and 68 may be aligned with corresponding openings within the back panel 22. A stud may then be inserted through each opening such that a head of the stud contacts the reinforcing bezel. A push nut may be secured to each stud, thereby compressing the edges of the retaining sheet between the bezel and the back panel. Such a configuration will effectively couple the outer edge 32 and the bottom edge 36 of the first side piece 42, and the outer edge 34 and the bottom edge 36 of the second side piece 44 to the back panel 22 of the seat back 18. While separate bezels 58 and 62 are employed in the illustrated embodiment, it should be appreciated that alternative embodiments may utilize a single bezel configured to extend along the bottom and side edges of each side piece.

Similarly, the sleeve 26 includes openings 70 configured to facilitate securing the bottom edge 40 of the sleeve 26 to the back panel 22. In the illustrated embodiment, the openings 70 are configured to align with corresponding openings 68 in the retaining sheet 24 and openings 66 within the bezels 58 and 62. For example, the bottom edge 40 of the sleeve 26 may be positioned between the bottom edge 36 of the retaining sheet 24 and the back panel 22. In this configuration, a stud may be inserted through each opening such that a head of the stud contacts the reinforcing bezel. A push nut may be secured to the stud, thereby compressing the bottom edge of the retaining sheet and the bottom edge of the sleeve between the bezel and the back panel. Such a configuration will effectively couple the bottom edge 40 of the sleeve 26 to the back panel 22, thereby blocking lateral movement of the sleeve 26 with respect to the retaining sheet 24.

With the sleeve 26 disposed about the retaining sheet 24, the elastic material 46 will be concealed, thereby enhancing the appearance of the storage pocket 20 in both the open and closed positions. In the illustrated embodiment, the sleeve 26 includes a first material 72 facing the interior 12 of the vehicle 10, and a second material 74, different from the first material, facing the back panel 22 of the seat 14. For example, the first material 72 may be the same material that forms the first and second side pieces 32 and 34 (e.g., leather, woven fabric, non-woven fabric, etc.). In addition, the color and/or texture of the first material 72 may substantially match the color and/or texture of the side piece material to provide a desirable appearance. Alternatively, the color and/or texture of the first material 72 may be particularly selected to contrast the side piece material, thereby accenting the storage pocket 20. Because the second material 74 is not visible to a vehicle occupant, a less expensive and/or lighter material may be provided to form the remainder of the sleeve 26. The first material 72 and the second material 74 may be secured by a first seam 76 adjacent to a top edge of the sleeve, and a second seam adjacent to a bottom edge of the sleeve.

Figure 6:
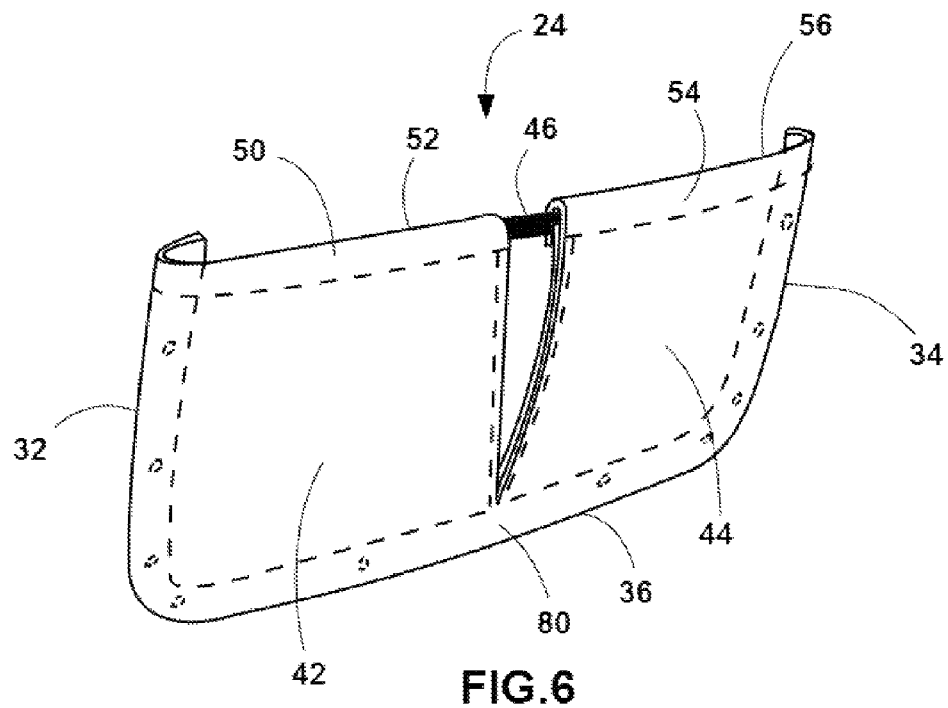
FIG. 6 is a perspective view of another embodiment of the retaining sheet.

FIG. 6 is a perspective view of another embodiment of the retaining sheet. As illustrated, the first side piece 42 is coupled to the second side piece 44 along a bottom edge 36 of the retaining sheet 24. Specifically, a strip of material 80 extends along the bottom edge 36 of the retaining sheet 24, thereby coupling the side pieces to one another. This configuration may enhance the strength of the bottom edge 36 of the retaining sheet 24, thereby enabling the pocket 20 to support additional weight. As will be appreciated, the height of the strip 80 may be particularly selected to provide the desired strength while facilitating expansion of the top edges 52 and 54 as the pocket is opened.

Figure 7:
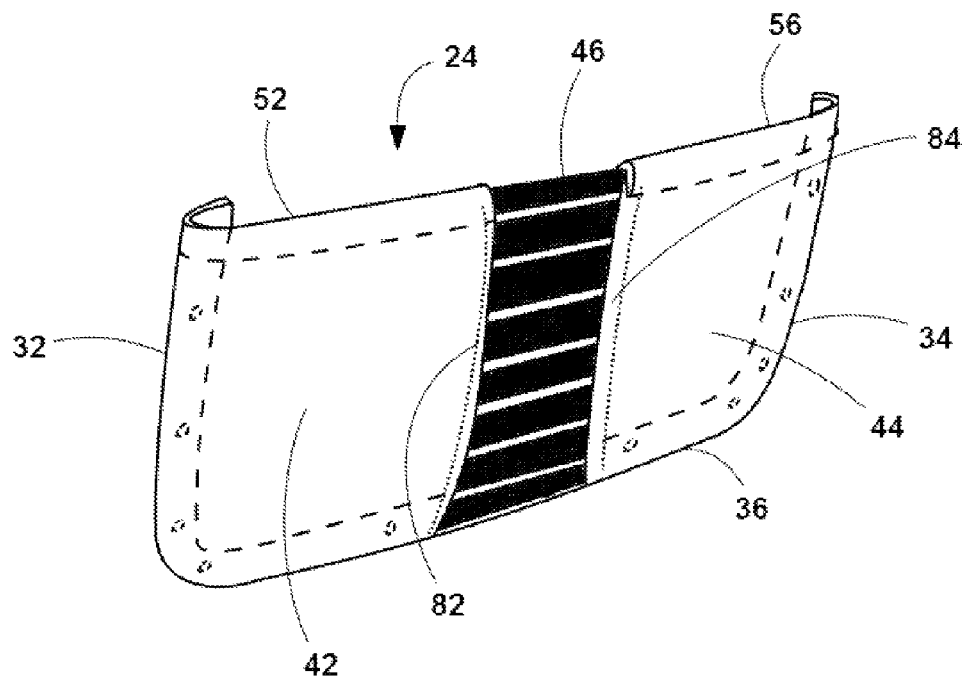
FIG. 7 is a perspective view of a further embodiment of the retaining sheet.

FIG. 7 is a perspective view of a further embodiment of the retaining sheet. In the illustrated embodiment, the resilient material 46 extends from the top edges 52 and 56 of the first and second side pieces 42 and 44 to the bottom edges 36 of the side pieces. Specifically, resilient material extends along the vertical extent of an inner edge 82 of the first side piece 42, and along the vertical extent of an inner edge 84 of the second side piece 44. While the resilient material in the illustrated embodiment is formed from multiple strands, it should be appreciated that a continuous piece of resilient material may be utilized in alternative embodiments. Because the resilient material 46 fills the entire vertical extent of the gap between side pieces, the possibility of an item within the receptacle 30 entering the interior of the storage pocket, or vice versa, is substantially reduced or eliminated. As a result, the storage area of the pocket and the storage area of the receptacle will remain substantially independent.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle interior storage pocket, comprising:
a retaining sheet comprising a first side piece, a second side piece, and a resilient material extending between the first side piece and the second side piece, wherein the resilient material is configured to bias the first and second side pieces toward one another, the retaining sheet comprises a show surface facing a vehicle interior, the first side piece comprises a first side edge on a first lateral side of the retaining sheet, and the second side piece comprises a second side edge on a second lateral side of the retaining sheet, opposite the first lateral side; and
a sleeve disposed about the resilient material, at least a portion of the first side piece, and at least a portion of the second side piece, wherein the sleeve is configured to conceal the resilient material without concealing a first portion of the show surface positioned proximate to the first side edge and a second portion of the show surface positioned proximate to the second side edge.

2. The vehicle interior storage pocket of claim 1, wherein the retaining sheet is secured to a vehicle interior trim component along the first side edge, along the second side edge, and along a bottom edge of the retaining sheet, and the sleeve is secured to the vehicle interior trim component along a bottom edge of the sleeve.

3. The vehicle interior storage pocket of claim 2, wherein the retaining sheet and the sleeve are secured to the vehicle interior trim component via a plurality of fasteners.

4. The vehicle interior storage pocket of claim 2, wherein the vehicle interior trim component comprises a back panel of a vehicle seat.

5. The vehicle interior storage pocket of claim 1, wherein the first side piece comprises a first hemmed pocket positioned adjacent to a top edge of the first side piece, the second side piece comprises a second hemmed pocket positioned adjacent to a top edge of the second side piece, and the resilient material extends through the first hemmed pocket and through the second hemmed pocket.

6. The vehicle interior storage pocket of claim 1, wherein the first side piece is coupled to the second side piece along a bottom edge of the first and second side pieces.

7. The vehicle interior storage pocket of claim 1, wherein the resilient material extends from a top edge of the first and second side pieces to a bottom edge of the first and second side pieces.

8. The vehicle interior storage pocket of claim 1, comprising a first reinforcing bezel extending along a bottom edge and the first side edge of the first side piece, and a second reinforcing bezel extending along a bottom edge and the second side edge of the second side piece.

9. The vehicle interior storage pocket of claim 1, wherein the sleeve comprises a first material facing a vehicle interior, and a second material, different from the first material, facing a vehicle interior trim component.

10. The vehicle interior storage pocket of claim 1, wherein the sleeve forms a receptacle between the show surface of the retaining sheet and a rear surface of the sleeve.

11. A vehicle interior storage pocket, comprising:
a retaining sheet comprising a first side piece, a second side piece, and a resilient material extending between the first side piece and the second side piece, wherein the resilient material is configured to bias the first and second side pieces toward one another; and
a sleeve disposed about the resilient material, at least a portion of the first side piece, and at least a portion of the second side piece, wherein the sleeve is configured to conceal the resilient material, the sleeve includes a show surface facing an interior of a vehicle, and the show surface is substantially smooth;
wherein an upper edge of the vehicle interior storage pocket does not include any wrinkles or gathers.

12. The vehicle interior storage pocket of claim 11, wherein the first side piece comprises a first hemmed pocket positioned adjacent to a top edge of the first side piece, the second side piece comprises a second hemmed pocket positioned adjacent to a top edge of the second side piece, and the resilient material extends through the first hemmed pocket and through the second hemmed pocket.

13. The vehicle interior storage pocket of claim 11, wherein the first side piece is coupled to the second side piece along a bottom edge of the first and second side pieces.

14. The vehicle interior storage pocket of claim 11, wherein the resilient material extends from a top edge of the first and second side pieces to a bottom edge of the first and second side pieces.

15. The vehicle interior storage pocket of claim 11, wherein the show surface is formed from a first material, and the sleeve comprises a second material different from the first material and facing a vehicle interior trim component.

16. A vehicle interior storage pocket, comprising:
a retaining sheet comprising a first side piece, a second side piece, and a resilient material extending between the first side piece and the second side piece, wherein the resilient material is configured to bias the first and second side pieces toward one another;
a sleeve disposed about the resilient material, at least a portion of the first side piece, and at least a portion of the second side piece, wherein the sleeve is configured to conceal the resilient material, the sleeve includes a show surface facing an interior of a vehicle, and the show surface is substantially smooth;
a first reinforcing bezel extending along a bottom edge and a side edge of the first side piece;
a second reinforcing bezel, separate from the first reinforcing bezel, extending along a bottom edge and a side edge of the second side piece;
a first fastener extending through a first opening in the first reinforcing bezel and a second opening in the first side piece, wherein the first fastener is configured to compress the first side piece between the first reinforcing bezel and a substantially rigid vehicle interior component; and
a second fastener extending through a third opening in the second reinforcing bezel and a fourth opening in the second side piece, wherein the second fastener is configured to compress the second side piece between the second reinforcing bezel and the substantially rigid vehicle interior component.

17. The vehicle interior storage pocket of claim 16, wherein the first side piece comprises a first hemmed pocket positioned adjacent to a top edge of the first side piece, the second side piece comprises a second hemmed pocket positioned adjacent to a top edge of the second side piece, and the resilient material extends through the first hemmed pocket and through the second hemmed pocket.

18. The vehicle interior storage pocket of claim 16, wherein the first side piece is coupled to the second side piece along a bottom edge of the first and second side pieces.

19. The vehicle interior storage pocket of claim 16, wherein the resilient material extends from a top edge of the first and second side pieces to the bottom edge of the first and second side pieces.

20. A vehicle interior storage pocket, comprising:
a retaining sheet comprising a first side piece, a second side piece, and a resilient material extending between the first side piece and the second side piece, wherein the resilient material is configured to bias the first and second side pieces toward one another;
a sleeve disposed about the resilient material, at least a portion of the first side piece, and at least a portion of the second side piece, wherein the sleeve is configured to conceal the resilient material, the sleeve includes a show surface facing an interior of a vehicle, and the show surface is substantially smooth;
a first reinforcing bezel extending along a bottom edge and a side edge of the first side piece;
a second reinforcing bezel, separate from the first reinforcing bezel, extending along a bottom edge and a side edge of the second side piece;
a first fastener extending through a first opening in the first reinforcing bezel and a second opening in the first side piece, wherein the first fastener is configured to compress the first side piece between the first reinforcing bezel and a substantially rigid vehicle interior component; and
a second fastener extending through a third opening in the second reinforcing bezel and a fourth opening in the second side piece, wherein the second fastener is configured to compress the second side piece between the second reinforcing bezel and the substantially rigid vehicle interior component;

wherein the first fastener extends through a fifth opening in a bottom edge of the sleeve, the second fastener extends through a sixth opening in the bottom edge of the sleeve, and the first and second fasteners are configured to compress the bottom edge of the sleeve between the first and second reinforcing bezels and the substantially rigid vehicle interior component.

21. The vehicle interior storage pocket of claim 20, wherein the first side piece comprises a first hemmed pocket positioned adjacent to a top edge of the first side piece, the second side piece comprises a second hemmed pocket positioned adjacent to a top edge of the second side piece, and the resilient material extends through the first hemmed pocket and through the second hemmed pocket.

* * * * *